United States Patent

[11] 3,572,965

[72] Inventor Harold R. Scheibe
King George, Va.
[21] Appl. No. 818,625
[22] Filed Apr. 23, 1969
[45] Patented Mar. 30, 1971
[73] Assignee The United States of America, as represented by the Secretary of the Navy

[54] HELICOPTER CONTROL MEANS
8 Claims, 1 Drawing Fig.

[52] U.S. Cl. .................................................. 416/18,
416/114, 416/155, 416/162
[51] Int. Cl. ............................................... B64c 27/74
[50] Field of Search........................................ 416/18,
114, 155, 162; 74/5.47

[56] References Cited
UNITED STATES PATENTS
| | | | |
|---|---|---|---|
| 2,368,698 | 2/1945 | Young.......................... | 416/18 |
| 2,396,038 | 3/1946 | Bossi............................ | 416/18 |
| 2,397,183 | 3/1946 | Kilgore et al................. | 416/162(X) |
| 2,439,089 | 4/1948 | Hodson........................ | 416/114 |
| 2,519,762 | 8/1950 | Hoffmann et al............. | 416/18 |
| 2,598,672 | 6/1952 | Braddon et al.............. | 74/5.47 |
| 2,992,563 | 7/1961 | Lassen.......................... | 74/5.47 |
| 3,135,335 | 6/1964 | Cruz et al..................... | 416/18 |
| 3,144,906 | 8/1964 | Shaw............................ | 416/18 |
| 3,256,780 | 6/1966 | Riley et al..................... | 416/114(X) |

*Primary Examiner*—Everette A. Powell, Jr.
*Attorneys*—Edgar J. Brower, Arthur L. Branning and T. O. Watson, Jr.

ABSTRACT: Torque motors are interposed in the control linkages used for processing the control gyro of a rigid rotor helicopter. Due to the inherent characteristics of a DC torque motor, this arrangement damps unwanted nutations of the control gyro while at the same time allowing accurate control of the processing of the control gyro.

Patented March 30, 1971
3,572,965
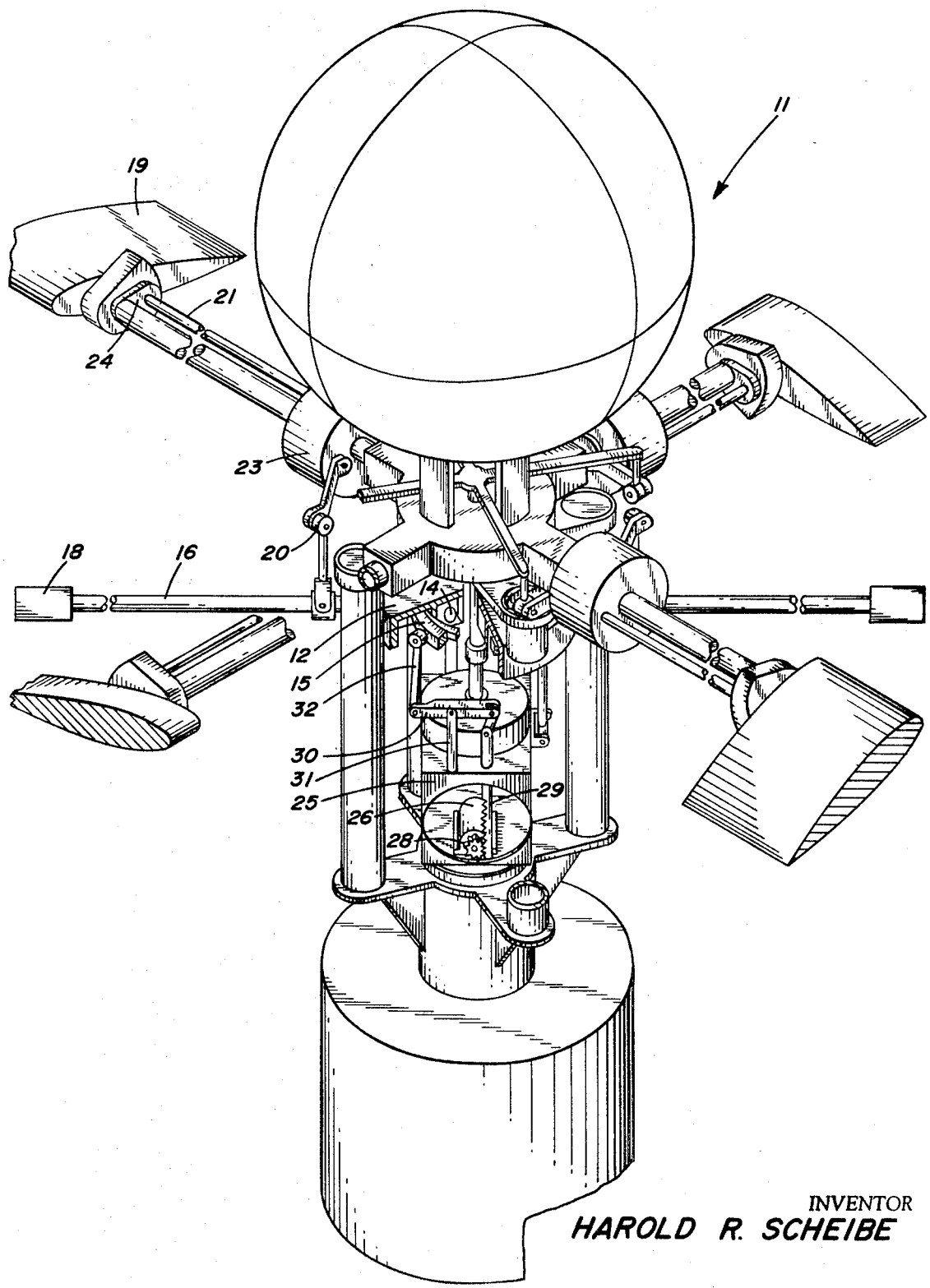
INVENTOR
HAROLD R. SCHEIBE
BY
ATTORNEY

HELICOPTER CONTROL MEANS

STATEMENT OF GOVERNMENT INTEREST

The invention described herein may be manufactured and used by or for the Government of the United States of America for governmental purposes therefor.

BACKGROUND OF THE INVENTION

1. Field of the Invention

This invention relates to means for controlling a rigid rotor helicopter and, more particularly, to means for precessing and damping nutations of a control gyro of a rigid rotor helicopter.

2. Description of the Prior Art

Gyro control systems for rigid rotor helicopters are well known in the prior art. For example, see U.S. Pat. Nos. 3,106,964 and 3,135,335. A rigid rotor is one which utilizes cantilevered nonarticulated blades which are rigidly attached to the rotor shaft. These blades are slaved to a control gyro consisting of laterally extending crossarms with weights at their ends. The crossarms are operatively connected to the swash plate and this control gyro swash plate assembly is mounted on the rotor drive shaft. The control gyro together with the gyroscopic characteristics of a rigid rotor provides for a high inherent stability of the rotor. The control gyro also receives pilot control inputs and transmits them to the rotor blades which respond by appropriate changes in blade pitch.

The inherent characteristics of gyroscopic motion makes gyro control possible but also creates problems. A gyroscope has precession which can be defined as the angular change of the plane of rotation under the action of the applied moment. When sufficient force is applied to change the plane of rotation of a gyroscope, the reaction occurs 90° later in the direction of the rotation and the angular change is in the direction of the applied moment. If the moment applied is not a constant force, nutations will be induced to the gyroscope, i.e., it will wobble like a top that is slowing to a stop.

To prevent nutation the prior art provided damping means such as dashpots between the helicopter body and the control gyro, for example, see U.S. Pat. No. 3,027,948.

In the prior art normally two control linkages were provided through which the pilot could transfer control motion to the control gyro via the swash plate and cause precession in the control gyro which in turn would control the pitch of the helicopter rotor blades. These control linkages would apply torque to the swash plate at points 90° removed from one another. Normally, resilient means such as spring cartridges were inserted in each of the control linkages. This is because when one linkage is used to apply a torque to the control gyro, the control gyro does not move out of its plane of rotation at the point of torque application but acts as if the torque has been applied 90° from the point of actual application. Thus, by precessing out of its rotational plane, the control gyro transmits back motion to the other control linkage. The spring cartridges interposed in the control linkages absorb this motion so that it is not transferred back to the pilot's control stick. In absorbing this motion the spring is tensioned and thereby exerts an opposing force which can introduce error into the positioning of the control gyro. This error must be compensated for by additional movement of the control stick by the pilot. These prior art spring cartridges can be seen in U.S. Pat. Nos. 3,106,964 and 3,135,335.

SUMMARY OF THE INVENTION

Applicant has combined means for damping nutation of the control gyro and means for performing the function of the spring cartridges with a more efficient means for applying torque to the control gyro. In each of the control linkages Applicant has provided a DC torque motor which transmits control motion to the control gyro via the swash plate. The torque motor is controlled by the pilot's stick or by an auto pilot system.

An object of the present invention is the provision of a control gyro system which damps nutations of the control gyro.

Another object of the present invention is to provide a control gyro control system which absorbs the back motion caused by gyro precession while introducing a minimum of error into the proper positioning of the control gyro.

A further object of the present invention is to provide a control gyro control system for applying torque to precess the control gyro.

BRIEF DESCRIPTION OF THE DRAWING

The FIGURE shows a typical helicopter rotor control gyro assembly having DC torque motors incorporated into the gyro control linkages.

DESCRIPTION OF THE PREFERRED EMBODIMENTS

The FIGURE shows a rigid rotor control gyro assembly generally designated as 11. This assembly is shown by way of example only, since Applicant's invention can be used with any prior art rigid rotor control gyro assembly. The assembly includes a control gyro hub 12 which contains a constant speed universal coupling 14. This constant speed universal coupling can be of any known type such as the Rzeppa constant velocity universal joint which is manufactured by the Dana Corporation, Detroit, Michigan. The swash plate 15 supports gyro arms 16 having end weights 18. The control gyro arms 16 are slaved to the helicopter rotor blade 19 with a system of simple linkages 20 and 21. Gearing systems in housings 22 and 24 provide the proper actuating ratios. Two torque motors connected to an appropriate power source, not shown, are provided in housing 25 and are connected to the swash plate so that upon actuation one applies torque to precess the control gyro in a north-south direction and the other in an east-west direction. Mounted on the rotor of torque motor 26 is a gear 28 which drives rack 29. Rack 29 is connected to one end of seesaw linkage 30 which is supported at its middle by pivot support 31. At its other end is rod 32 which is connected to the swash plate. Upon actuation of torque motor 26, a torque is applied to the swash plate and control gyro through the rack and pinion and linkage arrangement shown. An identical arrangement associated with another torque motor which is not shown is provided at the other side of casing 25 and serves to precess the control gyro in a direction orthogonal to the direction of precession caused by torque motor 26. The point of application of force to the swash plate by this other torque motor is 90° displaced from the point of application of force by torque motor 26.

The ratio of the linkage system connecting the torque motor to the control gyro in the preferred embodiment is such that the precessional torque applied to the control gyro is 10 times that developed by the motor. The torque applied at the control gyro controls the rate of precession of the gyro according to the following equation:

$$T = IAP$$

where $T$ = torque at control gyro in ft. lbs.

$I$ = spin inertia of control gyro in radians/sec. ft.$^2$ $A$ = precession rate of control gyro in radians/sec.

$P$ = rotor frequency in radians/sec. If we assume an $I$ of 0.5, $P$ of 62.8 and $T$ at the control gyro of 1 ft. lb., the precession will occur at 0.0318 radians/sec. Because of the above-mentioned linkage ratio the torque at the torque motor developed was only 0.1 ft. lb.

The motor used in the preferred embodiment is a DC torque motor of conventional design. As is well known when an outside torque is applied to the rotor of a DC torque motor, rotation of the rotor will develop a back e.m.f. which will damp rotation of the rotor. The damping force is proportional to the velocity at which the outside torque attempts to drive the rotor. When motor 26 applies a torque to the control gyro the gyro will precess in a direction 90° to the direction of the applied moment. This will cause the other control linkage (which is connected to the swash plate at a point spaced 90° from the point of connection of rod 32) to rotate the rotor of the other torque motor. The resistance to this rotation which is felt by the control gyro is the precession rate times the damping coefficient of the torque motor times the linkage ratio squared. The damping coefficient of a torque motor used in Applicant's invention is approximately 0.025 ft. lb./rad./sec. With the precession rate of 0.0318 rad./sec. as previously computed and the linkage ratio squared being 100, the damping torque felt by the control gyro would by 0.0795 ft. lbs. which is nearly negligible and easily compensated for. Thus, Applicant's torque motors allow application of precessional torque by one linkage without interference with precession of the control gyro from the other linkage. They perform a function similar to the spring cartridges described in the prior art, however, they do not develop nearly as large a force resisting precession of the control gyro as do the spring cartridges.

Gyros such as the control gyro nutate at a rate two times the frequency of the gyro rotation. Since the angular rate of the nutation is quite high the damping effect of the torque motors is also quite high. The damping provided is equal to the linkage ratio squared times the damping coefficient of the torque motor times the nutation rate. With a linkage ratio of 10, a typical damping coefficient of 0.25 ft. lb./rad./sec. and a nutation rate of two times the frequency of rotor rotation (or 125.6 rad./sec.), the damping force provided is equal to 314 ft. lb./rad. of nutation amplitude, or in dynamic terms, damping of the control gyro in each axis at a rate of 2.5 lb./rad./sec. This is a lower value than normally incorporated in systems of this type, but, it is adequate where, as here, there is no spring coupling between the control gyro and a fixed reference. Therefore, it can be seen that the torque motors also provide a damping means for damping unwanted nutation of the control gyro.

Applicant has chosen to use a DC torque motor, however, any motor, for example, a hydraulic type motor could be used provided it could exert precessional torque on the control gyro, allow precessional motion of the control gyro with little damping force, and/or provide substantial damping force to damp nutations of the control gyro. Obviously, if more than two control linkages were to be used to apply torque to the control gyro, each linkage used would include a torque motor. Applicant has provided means for actuating the control gyro which combines the functions of the mechanical actuation linkages of the prior art, the spring cartridge precessional motion absorbers of the prior art and the nutation dampers of the prior art. The application of this invention is not confined to helicopters. It can be used anywhere it is desirable to apply control torque to a gyro and to damp nutation.

Obviously many modifications and variations of the present invention are possible in the light of the above teachings.

I claim:

1. A helicopter control unit comprising:

A rigid helicopter rotor having variable pitch blades thereon;

a swash plate;

a control gyro connected to said swash plate;

means interconnecting said control gyro and said helicopter rotor so that a change in the plane of rotation of either causes a compensating change in the pitch of said blades;

two sets of control linkage means for applying torque to said swash plate to precess said control gyro in first and second directions; and a first means connected within one of said linkage means for causing said one of said linkage means to apply a torque to said swash plate while acting to damp control gyro nutations and to absorb back motion through said one of said linkage means caused by the action of the other of said linkage means upon the control gyro.

2. The control means of claim 1 wherein the first means comprises a DC torque motor.

3. The control means of claim 2 wherein the first means further comprises a pinion connected to the shaft of the motor and a rack in mesh with the pinion.

4. The control means of claim 1 further comprising a second means connected within the other of said linkage means for causing said other of said linkage means to apply a torque to said swash plate while acting to damp control gyro nutations and to absorb back motion through said other of said linkage means caused by the action of said one of said linkage means upon the control gyro.

5. The control means of claim 4 wherein said second means comprises a DC torque motor.

6. The control means of claim 4 wherein both said first and second means comprise DC torque motors.

7. The combination of claim 6 wherein both said first and second means further comprise a pinion connected to the shaft of each motor, a rack in mesh with each said pinion and a linkage system for transmitting force imparted to each said rack to said swash plate.

8. The combination of claim 7 wherein said first direction and said second direction are mutually orthogonal.